United States Patent [19]

Chastagner

[11] Patent Number: 5,326,540
[45] Date of Patent: Jul. 5, 1994

[54] CONTAINMENT SYSTEM FOR SUPERCRITICAL WATER OXIDATION REACTOR

[76] Inventor: Philippe Chastagner, 3134 Natalie Cir., Augusta, Ga. 30909-2748

[21] Appl. No.: 798,784

[22] Filed: Nov. 27, 1991

[51] Int. Cl.$^5$ .............................. F28D 21/00
[52] U.S. Cl. ................... 422/205; 422/159; 422/202; 376/283; 376/277; 376/310; 210/167; 210/205; 210/761; 210/237
[58] Field of Search ............... 210/167, 172, 205, 232, 210/237, 761; 422/159, 202, 205; 376/282, 283, 277, 310

[56] References Cited

U.S. PATENT DOCUMENTS

| | | | |
|---|---|---|---|
| 3,168,445 | 2/1965 | Ziegler et al. | 376/283 |
| 3,231,339 | 1/1966 | Murthy et al. | 23/290 |
| 3,282,459 | 11/1966 | Wilson | 220/3 |
| 3,671,199 | 6/1972 | Heady et al. | 422/159 |
| 3,773,471 | 11/1973 | Macey | 422/202 |
| 3,852,192 | 12/1974 | Fassell et al. | 210/63 |
| 3,970,208 | 7/1976 | Raes | 376/277 |
| 3,971,732 | 7/1976 | Meier | 422/159 |
| 4,022,655 | 5/1977 | Gaoudite et al. | 376/283 |
| 4,347,144 | 8/1982 | Bodenbenner et al. | 210/761 |
| 4,504,439 | 3/1985 | Elter et al. | 376/277 |
| 4,594,164 | 6/1986 | Titmas | 210/741 |
| 4,618,479 | 10/1986 | Santillie et al. | 422/202 |
| 4,668,493 | 5/1987 | Levin | 423/349 |
| 4,702,879 | 10/1987 | Tower et al. | 376/283 |
| 4,792,408 | 12/1988 | Titmas | 210/747 |
| 4,801,424 | 1/1989 | Schweiger et al. | 376/283 |
| 4,808,369 | 2/1989 | Yamanari et al. | 376/283 |
| 4,873,050 | 10/1989 | Eckardt | 376/313 |
| 5,100,560 | 3/1992 | Huang | 210/761 |

Primary Examiner—Peter A. Hruskoci
Assistant Examiner—Robert James Popovics
Attorney, Agent, or Firm—Brian R. Tumm; Harold M. Dixon; William R. Moser

[57] ABSTRACT

A system for containment of a supercritical water oxidation reactor in the event of a rupture of the reactor. The system includes a containment for housing the reaction vessel and a communicating chamber for holding a volume of coolant, such as water. The coolant is recirculated and sprayed to entrain and cool any reactants that might have escaped from the reaction vessel. Baffles at the entrance to the chamber prevent the sprayed coolant from contacting the reaction vessel. An impact-absorbing layer is positioned between the vessel and the containment to at least partially absorb momentum of any fragments propelled by the rupturing vessel. Remote, quick-disconnecting fittings exterior to the containment, in cooperation with shut-off valves, enable the vessel to be isolated and the system safely taken off-line. Normally-closed orifices throughout the containment and chamber enable decontamination of interior surfaces when necessary.

20 Claims, 2 Drawing Sheets

CONTAINMENT SYSTEM FOR SUPERCRITICAL WATER OXIDATION REACTOR

The United States Government has rights in this invention pursuant to Contract No. DE-AC09-89SR18035 between the U.S. Department of Energy and Westinghouse Savannah River Company.

BACKGROUND OF THE INVENTION

1. Field of the Invention

The present invention relates to a containment system for a supercritical water oxidation reactor. In particular, the present invention contains the radioactive or hazardous reactants in the event of a catastrophic failure of the reactor.

2. Discussion of Background

Methods and apparatus for conducting chemical reactions at supercritical conditions are known. See the descriptions in U.S. Pat. Nos. 4,594,164 and 4,792,408 both issued to Titmas. Furthermore, there are reaction vessels that are surrounded by protective containments and those that are sunken into a material that can serve as a shield. Both Titmas patents show sunken reaction vessels.

In U.S. Pat. No. 4,668,493, Levin describes a process for producing, continuously and at almost 100% yield, molten, solar cell-grade, elemental silicon by thermal reaction of a gas such as silane ($SiH_4$) in a cylindrical reactor mounted within a containment. The cylinder envelops the reactor apparatus in a inert gas and provides thermal insulation.

Santillie, et al., use a cylindrical reactor surrounded by a cylindrical jacket, in U.S. Pat. No. 4,618,479, for producing chlorine dioxide by reacting gaseous sulfur dioxide with a metal chlorate in aqueous solution. Heat generated in the reaction chamber is absorbed by water flowing through the annulus between the jacket and the reactor.

U.S. Pat. No. 3,852,192 issued to Fassell, et al describes the use of a reactor for the wet oxidation of organic matter. The reactor chamber is subdivided into a plurality of compartments with communicating passages throughout and surrounded by a roughly concentric containment vessel with inlet and outlet ports.

However, there remains a need for a containment system that will prevent the loss of reactants, especially toxic or radioactive reactants, in the event of a major rupture of a reaction vessel while it is operating at high pressure.

SUMMARY OF THE INVENTION

According to its major aspects and broadly stated, the present application is an apparatus for use with a reaction vessel that operates at elevated pressure and has typically two inlet lines and two outlet lines. The apparatus comprises a containment substantially surrounding the reaction vessel and spaced apart therefrom and a chamber in communication with the containment for holding a volume of continuously recirculating coolant, such as water. The containment is dimensioned so that, in the event of a complete rupture of the reaction vessel, the pressure within the apparatus will not exceed the pressure rating limit of the containment wall. Moreover, the recirculating coolant, sprayed into the chamber from the recirculating line, will help entrain and cool the reactants released as a result of the rupture. Baffles prevent the sprayed coolant from contacting the reaction vessel.

The inlet and outlet lines pass through flanged ends of the containment to shutoff valves, preferably two for each line, separated by a remotely-operated, quick-disconnecting fitting so that the system can be isolated by the valves and taken off line for repair and decontamination. The entire apparatus comprises sections with flanged ends, joined end to end, easily disassembled, and having lifting rings or eyes for convenient attachment to a crane hook. Orifices, normally sealed, in the containment and chamber walls allow operators to gain entrance to the interior of the sections for decontamination.

An important feature of the present invention is the combination of the containment and chamber. Together, they assure that the pressure of the system and its temperature, following a reaction vessel rupture, are quickly brought to nominal levels. The containment is large enough to absorb the initial pressure spike following rupture and to bring the pressure down by a factor of four in a typical case. Meanwhile the temperature of the system including the reactants is lowered by the coolant, which further reduces system pressure. The volume of coolant should be at least approximately equal to the volume of the containment. This feature will assure the reactants are safely contained.

An optional but important feature of the apparatus is the impact-absorbing mesh surrounding the reaction vessel on the inside of the containment. It is possible that the force of a rupturing pressure vessel could result in fragments of the vessel being propelled toward the containment. By including a metal mesh adjacent to the reaction vessel, these fragments may be stopped by the mesh or slowed sufficiently so that they do not penetrate the containment.

The recirculation and spraying of the coolant is another important feature of the present invention. Moving coolant, especially coolant in the form of droplets, will cool and entrain a much greater volume of reactants than still coolant.

The features that allow the apparatus to be moved, taken apart in sections and decontaminated are also very important features of the present invention. Especially in handling toxic and radioactive materials, anticipating that accidents will occur and how they will occur and designing features to make the handling of the resulting contaminated materials easier, quicker and safer, reduces the risk of personal injury and eliminates unnecessary exposure to chemical and radioactive hazards.

Other features and advantages of the present invention will be apparent to those skilled in the art from a careful reading of the Detailed Description of a Preferred Embodiment presented below and accompanied by the drawings.

DETAILED DESCRIPTION OF A PREFERRED EMBODIMENT

Figure 1:
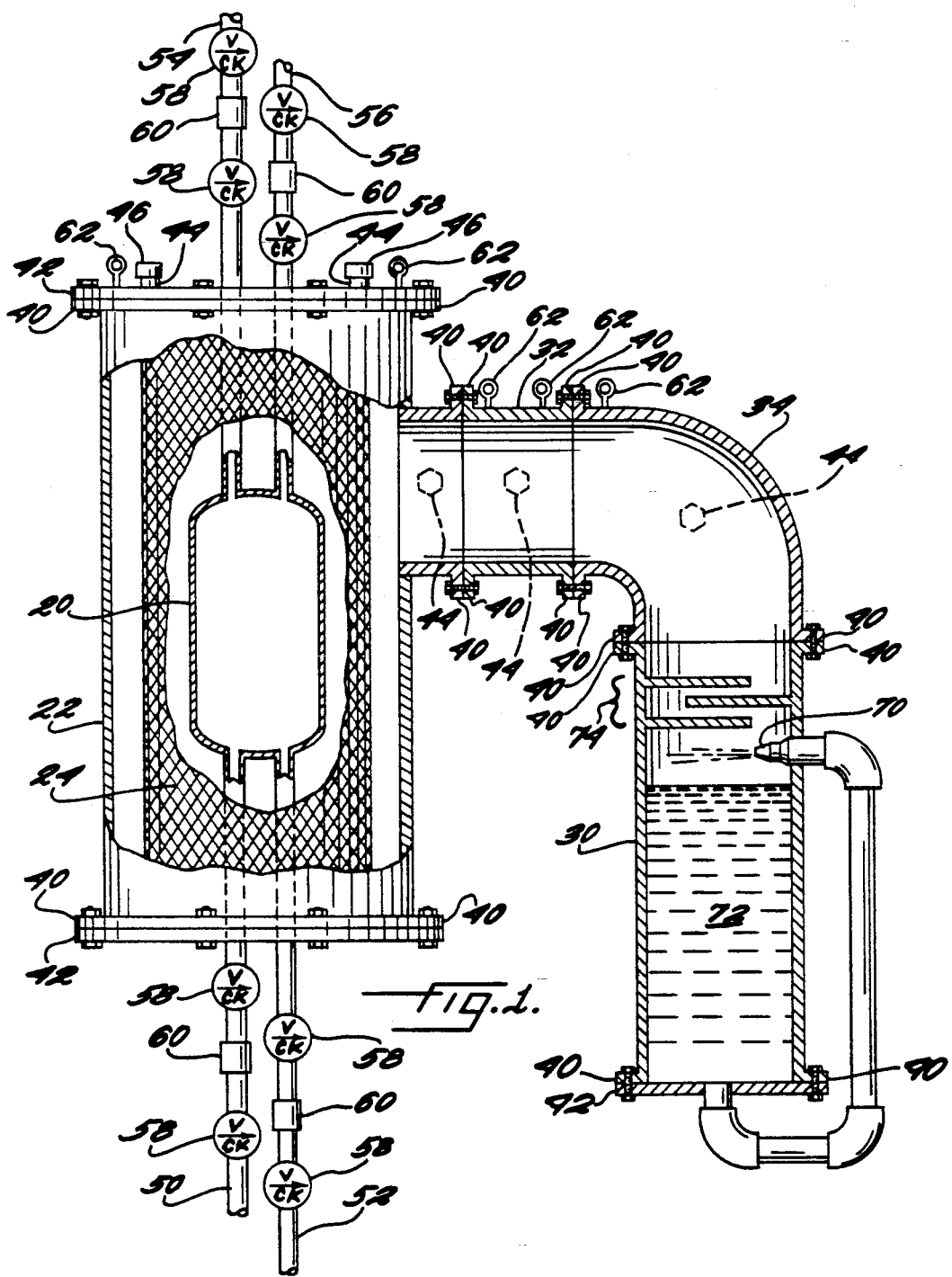
FIG. 1 is a side, cross sectional view of a containment system according to one preferred embodiment of the present invention.

Referring now to FIG. 1, which illustrates one of two preferred embodiments of the present invention, which is an apparatus for mitigating the consequences of a rupture of a reaction vessel. In particular, the apparatus provides protection in the event of the rupture of a supercritical water oxidation reactor operating at elevated pressure, by containing the spilled reactants and limiting the other physical consequences of the accident.

The reaction vessel is indicated generally by the reference numeral 20 and is positioned with a containment 22 that substantially surrounds vessel 20 but is spaced apart from it. Preferably, containment 22 is concentric with reaction vessel 20. Between containment 22 and vessel 20 is a metal or fabric mesh 24, the function of which will be described presently. A chamber 30 is oriented to one side of containment 22 and parallel thereto, but is otherwise in fluid communication with containment 20 so that gases can pass easily from containment 22 to chamber 30. One straight and one elbow-shaped section of boiler piping, 32 and 34, respectively, connect containment 22 and chamber 30.

Containment 22 is sized so that, if reaction vessel 20 ruptures, the instantaneous pressure will not exceed the pressure rating of the wall of containment 22. Typically, in a vessel operating at 3400 psig, a containment having a volume approximately four times the volume of its associated reaction vessel will result in a pressure following rupture of not more than 850 psig and probably substantially lower than that because of the rapid cooling of the reactants that takes place upon rupture into a larger volume. Boiler piping is typically rated at 1000 psig and fabricated in accordance with ASME Boiler Pressure codes for integrity and is therefore suitable for use as a containment.

If, upon rupture of reaction vessel 20, fragments are propelled outwardly, having a momentum-absorbing layer such as mesh, will prevent a fragment from possibly penetrating the wall of containment 22. Instead of mesh 24 being in the form of a screen, sheet metal may be used as long as containment 22 is in fluid communication with chamber 30 and the total volume is sufficient for reducing the pressure of the rupturing vessel contents.

Each section of piping has two ends. Each end has a flange 40 and is either bolted to an adjacent section or covered with and bolted to a plate 42 with only those penetrations through plate 42 as are needed. In particular, a number of orifices 44 are formed into containment 22, chamber 30, straight and elbow-shaped sections, 32, 34. Orifices 44 are normally sealed by threaded caps 46 but, following a rupture, can be opened to facilitate decontamination of internal surfaces. Decontamination can be effected by a number of standard techniques including leaching, rising, and manual techniques.

Containment 22 has four penetrations: a cold water inlet 50, a brine/slurry outlet 52, a feed inlet 54 and a supercritical effluent outlet 56. Each inlet or outlet line may be closed by a valve 58. In fact, preferably, two valves 58 are used to isolate each inlet and outlet line. Most preferably a remotely-operated, quickly-disconnected connector 60, such as the well-known Hanford connector, is placed between two valves 58 on each line. Thus the two valves can be shut and the system disconnected quickly and remotely. Then, the system can be moved off-line for repairs, decontamination or testing, as desired. Eye-bolts 62 are provided for lifting by a crane with a standard cable and hook.

If necessary and if decontaminated, each section can be unbolted from the adjacent section to simplify transport of the system section by section.

Chamber 30 has a recirculation line with a nozzle 70 and a pump 71 to continually circulate coolant 72, preferably water. Nozzle 70 sprays coolant into chamber 30 but a series of baffles 74 prevent the spray from reaching and coming into contact with reaction vessel 20. Because reaction vessel 20 is operating at high temperature, cold spray coming into contact with its surface may result in metallurgical and thermal stresses. However, if reaction vessel 20 ruptures and releases reactants, coolant 72 will absorb heat more quickly because of the better heat transfer that occurs between a spray compared to a still pool of coolant and will entrain the reactants. It is preferred to have the volume of chamber 30 be approximately equal to or greater than the volume of the containment 22.

Figure 2:
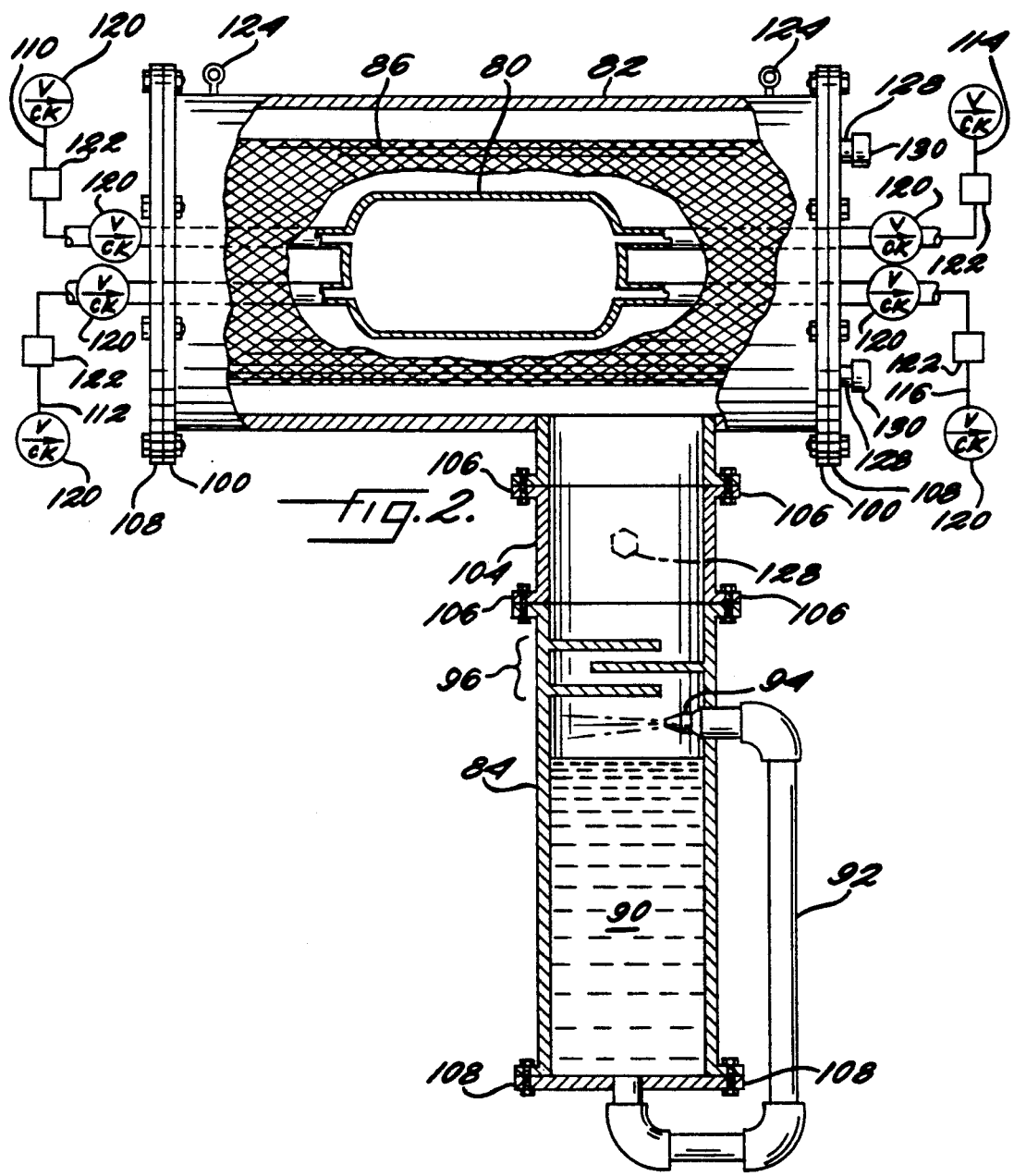
FIG. 2 is a side, cross sectional view of another preferred embodiment of the containment system according the present invention.

FIG. 2 shows an alternative embodiment with a pressure vessel 80 simply reoriented to the horizontal position and positioned concentrically within a containment 82. The interior of containment 82 is in fluid communication with a chamber 84 which remains, however, vertically oriented. An impact-absorbing mesh 86, inside containment 82 surrounds pressure vessel 80 to stop or slow any fragments that might be propelled toward containment 82 as a result of a rupture.

Pump 88 circulates coolant 90 between chamber 84 and a recirculation line 92, sprayed by nozzle 94 back into chamber 84, to provide a cooling and entraining mist. Baffles 96 again prevent coolant from coming into contact with the exterior surface of pressure vessel 80.

As in the first embodiment, containment 82 is a piping section with a flange 100 at each end and chamber 84 is a section with a flange 102 at each end. An intermediate section 104, also having flanges 106, connects containment 82 and chamber 84. The flanged sections are bolted together. Where a section is not adjoined by another section, a plate 108 seals the end except for penetrations for the various connections. There are four connections to pressure vessel 80 through penetrations into plates 108: a cold water inlet 110, a brine/slurry outlet 112, a feed inlet 114 and a supercritical water outlet 116. Each connection includes two valves 120, each two valves 120 having a remotely-disconnectable connector 122 therebetween.

Eyebolts 124 enable the whole system or any of its sections to be lifted clear of the balance of the plant. Each section has one or more orifices 128 in the walls of the sections that enable decontamination of the walls. Orifices 128 are normally sealed by threaded caps 130.

In the event of a rupture, reactants are suddenly depressurized and may go into a gaseous phase if not already gaseous. The pressure drop results from the relatively greater volume of the containment 82, preferably four times the size of the pressure vessel 80, that the reactant enters; furthermore, the chamber 84 enables the reactants to quickly cool in the spray of the recirculating coolant. The cooling of the reactants also lowers pressure. If the rupture results in a fragment of the pressure vessel 80 being propelled outwardly, mesh 86 will stop or slow the fragment to prevent a puncture of containment 82.

It will be apparent to those skilled in the art that many changes and substitutions can be made to the preferred embodiment herein described without departing from the spirit and scope of the present invention as defined by the appended claims.

What is claimed is:

1. An apparatus for use with a reaction vessel and a liquid coolant, said reaction vessel operating at a pressure and having at least one inlet line and at least one outlet line, said apparatus comprising:
a containment substantially surrounding said reaction vessel and spaced apart therefrom, said containment having a first wall with a pressure rating limit, said wall defining a volume;
a chamber adjacent to, extending from and in fluid communication with said containment and having a second wall, said first wall in sealing engagement with said second wall, said chamber containing said liquid coolant therein; and
baffle means between said reaction vessel and said coolant in said chamber for preventing said coolant from contacting said reaction vessel,
said containment dimensioned so that, in the event of a rupture of said reaction vessel, said pressure will not exceed said pressure rating limit of said wall.

2. The apparatus as recited in claim 1, further comprising means for recirculating said coolant in said chamber.

3. The apparatus as recited in claim 1, further comprising:
a conduit attached to said chamber and in communication with said coolant for carrying said coolant;
means for pumping said coolant from said chamber through said conduit; and
means for spraying said coolant from said conduit into said chamber between said baffle means and said coolant.

4. The apparatus as recited in claim 1, wherein said reaction vessel may break into fragments if said reaction vessel ruptures, and wherein said containment further comprises means disposed between said wall and said reaction vessel for catching said fragments.

5. The apparatus as recited in claim 1, wherein said reaction vessel may break into fragments if said reaction vessel ruptures, said reaction vessel contains a fluid and said containment further comprises means disposed between said wall and said reaction vessel for catching said fragments of said reaction vessel, said catching means being porous so that said fluid can pass therethrough.

6. The apparatus as recited in claim 1, wherein said first wall of said containment and said first wall of said chamber are bolted together.

7. The apparatus as recited in claim 1, wherein said coolant has a volume approximately at least equal to said volume of said containment.

8. The apparatus as recited in claim 1, wherein said reaction vessel has a volume no greater than approximately one fourth of said volume of said containment.

9. The apparatus as recited in claim 1, further comprising:
means for disconnecting said at least one inlet line and said at least one outlet line of said reaction vessel; and
first means for isolating said at least one inlet line and said at least one outlet line of said reaction vessel,
said disconnecting means and said first isolating means located just external to said containment.

10. The apparatus as recited in claim 1, further comprising:
means for disconnecting said at least one inlet line and said at least one outlet line of said reaction vessel; and
first means for isolating said at least one inlet line and said at least one outlet line of said reaction vessel;
second means for isolating said at least one inlet line and said at least one outlet line of said reaction vessel,
said disconnecting means and said first and second isolating means located just external to said containment, said disconnecting means positioned between said first and said second isolating means.

11. An apparatus for use with a reaction vessel containing fluid reactants and with a liquid coolant, said reaction vessel operating at a pressure and having at least one inlet line and at least one outlet line, said apparatus comprising:
a containment substantially surrounding said reaction vessel and spaced apart therefrom, said containment having a first wall with a pressure rating limit, said wall defining a volume, said containment dimensioned so that, in the event of a rupture of said reaction vessel, said pressure will not exceed said pressure rating limit of said wall;
a chamber adjacent to, extending from and in fluid communication with said containment holding and containing said liquid coolant therein, said chamber having a second wall, said first wall in sealing engagement with said second wall;
baffle means comprising a series of baffles in said chamber for preventing said coolant from contacting said pressure vessel, said baffle means enabling at least a portion of said reactants to contact said coolant in the event of a rupture of said reaction vessel; and
means attached to said chamber for recirculating said coolant within said chamber, said recirculating means having
means for spraying said coolant into said chamber between said baffle means and said coolant.

12. The apparatus as recited in claim 11, wherein said containment and said chamber are formed in sections, each section terminating in a flanged end, so that one flanged end of one section can be bolted to an adjacent flanged end of an adjacent section, said containment further comprising at least one section having two flanged ends, said apparatus further comprising:
first means for isolating said at least one inlet line and said at least one outlet line of said reaction vessel;
second means for isolating said at least one inlet line and said at least one outlet line of said reaction vessel,
said disconnecting means and said first and second isolating means located just external to said containment and in fluid communication with said reaction vessel through said at least two flanged ends, and said disconnecting means positioned between said first and said second isolating means.

13. The apparatus as recited in claim 11, wherein said reaction vessel may break into fragments if said reaction vessel ruptures and said containment further comprises means disposed between said wall and said reaction vessel for catching said fragments of said reaction vessel, said catching means being porous so that said fluid reactants can pass therethrough.

14. The apparatus as recited in claim 11, wherein said containment and said chamber have interior surfaces, and said apparatus further comprises a plurality of orifices in said containment and said chamber, said orifices being normally sealed but being openable to decontaminate said interior surfaces.

15. The apparatus as recited in claim 11, wherein said coolant has a volume approximately at least equal to said volume of said containment.

16. The apparatus as recited in claim 11, wherein said pressure rating limit is at least approximately one-fourth said pressure of said reaction vessel, and wherein said reaction vessel has a volume no greater than approximately one fourth said containment volume.

17. An apparatus for use with a reaction vessel containing fluid reactants therein, said reaction vessel operating at a pressure and having at least one inlet line and at least one outlet line, said apparatus comprising:
   a containment substantially surrounding said reaction vessel and spaced apart therefrom, said containment having a volume, a pressure, and a wall with a pressure rating limit, said pressure rating limit being at least approximately one-fourth said pressure;
   a chamber adjacent to, extending from and in communication with said containment;
   said chamber holding a liquid coolant therein, said coolant having a volume approximately at least equal to said volume of said containment;
   baffle means comprising a series of baffles in said chamber for preventing said coolant from contacting said reaction vessel, said baffle means enabling at least a portion of said reactants to contact said coolant;
   means in fluid communication with said coolant for recirculating said coolant; and
   means in fluid communication with said recirculating means for spraying said coolant,
   said containment dimensioned so that, in the event of a rupture of said reaction vessel, said pressure in said containment does not exceed said pressure rating limit.

18. The apparatus as recited in claim 17, wherein said containment and said chamber have interior surfaces, and wherein said containment and said chamber are formed in sections, each section terminated in a flanged end, so that one flanged end of one section can be separated from an adjacent flanged end of an adjacent section, each of said sections having at least one orifice, said orifice normally sealed but openable for enabling the decontamination of said interior surfaces, said containment further comprising at least one section having at least two flanged ends, said apparatus further comprising:
   means for disconnecting said at least one inlet line and said at least one outlet line of said reaction vessel;
   first means for isolating said at least one inlet line and said at least one outlet line of said reaction vessel;
   said disconnecting means and said first isolating means located just external to said containment and in fluid communication with said reaction vessel through said at least two flanged ends, and said first isolating means positioned between said disconnecting means and said at least one flanged end.

19. The apparatus as recited in claim 17, wherein said reaction vessel may break into fragments if said reaction vessel ruptures and said containment further comprises means disposed between said wall and said reaction vessel for catching said fragments of said reaction vessel, said catching means being porous so that said fluid reactants can pass therethrough.

20. The apparatus as recited in claim 17, further comprising means for lifting said containment and said chamber.

* * * * *